United States Patent [19]

Misaka et al.

[11] Patent Number: 5,581,404

[45] Date of Patent: Dec. 3, 1996

[54] IMAGE STABILIZING APPARATUS

[75] Inventors: Makoto Misaka, Yokohama; Ichiro Onuki, Kawasaki, both of Japan

[73] Assignee: Canon Kabushiki Kaisha, Tokyo, Japan

[21] Appl. No.: 336,229

[22] Filed: Nov. 3, 1994

Related U.S. Application Data

[63] Continuation of Ser. No. 998,595, Dec. 30, 1992, abandoned.

[30] Foreign Application Priority Data

Jan. 10, 1992 [JP] Japan .................. 4-021723
Jun. 19, 1992 [JP] Japan .................. 4-186186

[51] Int. Cl.[6] ................................ G02B 27/64
[52] U.S. Cl. .............. 359/557; 359/813; 359/823
[58] Field of Search ........................ 359/557, 813, 359/814, 738, 739, 823

[56] References Cited

U.S. PATENT DOCUMENTS

| | | | |
|---|---|---|---|
| 1,784,425 | 12/1930 | George | 359/738 |
| 4,492,440 | 1/1985 | Nishioka | 359/738 |
| 4,907,868 | 3/1990 | Kitagishi et al. | |
| 5,000,549 | 3/1991 | Yamazaki | 359/557 |
| 5,037,188 | 8/1991 | Karasaki et al. | 359/738 |
| 5,069,537 | 12/1991 | Kitagishi | 359/813 |
| 5,153,777 | 10/1992 | Okada et al. | 359/739 |
| 5,172,276 | 12/1992 | Ueyama et al. | 359/813 |

FOREIGN PATENT DOCUMENTS 62-44707  2/1987  Japan .

*Primary Examiner*—John T. Kwon
*Attorney, Agent, or Firm*—Fitzpatrick, Cella, Harper & Scinto

[57] ABSTRACT

Disclosed is an image stabilizing apparatus for correcting image blur by driving at least one of a plurality of lens units constituting an objective lens such that the lens unit is decentered from an optical axis. To prevent incidence of light on an image surface from a space formed when the lens unit is driven, a light-shielding member is provided in this space.

21 Claims, 12 Drawing Sheets

IMAGE STABILIZING APPARATUS

This application is a continuation of application Ser. No. 07/998,595 filed Dec. 30, 1992, now abandoned.

BACKGROUND OF THE INVENTION

1. Field of the Invention

The present invention relates to an apparatus for optically correcting image blur occurring in photographing on vehicles or caused by a camera shake.

2. Related Background Art

Conventionally, various photographing lenses have been proposed, which have a blur correcting means for moving a correcting lens unit as a part of a photographing lens in a direction perpendicular to the optical axis to correct blur of a photographed image occurring when vibrations are transmitted to a photographing system.

As an example, Japanese Laid-Open Patent Application No. 62-44707 has proposed a photographing lens having a blur correcting means for correcting blur of a photographed image occurring when photographing is performed on moving objects, such as running vehicles or flying airplanes, by moving a correcting lens unit in a direction perpendicular to the optical axis.

FIGS. 9A, 9B, and 10 are schematic views each showing an optical system in which light beams passing through individual lens units are illustrated assuming that a partial lens unit 12 constituting a zoom lens is used as a correcting lens unit and this lens unit 12 is moved in a direction perpendicular to the optical axis to correct blur of a photographed image.

Referring to FIGS. 9A and 9B, a magnification change from a wide-angle end to a telephoto end is performed by moving the lens unit 12 in the direction of optical axis toward an image surface as indicated by an arrow, and a variation in an image surface caused by the magnification change is corrected by moving a lens unit 11 nonlinearly in the optical axis direction. This optical system also includes a diaphragm 15 with a variable aperture diameter and a relay lens unit 13 kept fixed during the magnification change.

FIGS. 9A and 9B illustrate conditions in which light beams propagate through the individual lens units in a zoom position at the wide-angle end and in a zoom position at the telephoto end, respectively. FIG. 10 illustrates a condition in which light beams propagate through the individual lens units in the zoom position shown in FIG. 9B when the lens unit 12 is moved upward in the drawing surface in a direction (to be also referred to as a "positive direction" hereinafter) perpendicular to the optical axis to correct blur of a photographed image.

Generally, to correct blur of a photographed image, a partial lens unit constituting a photographing lens, e.g., a lens unit before a diaphragm is used as a correcting lens unit. When this correcting lens unit is decentered parallel in the positive direction (upward), a quantity of light increases in a negative portion ha where an image height extends downward and largely decreases in a positive portion hb where the image height extends upward. This produces a significant difference in illuminance of the field between the upper and lower portions of a screen, resulting in a variation in brightness on the screen.

When a lens unit (e.g., the lens unit 13) behind the diaphragm is used as the correcting lens unit, the relationship of a difference in light quantity between the peripheral portions of the screen is reversed. This significantly degrades the quality of a photographed image.

Another example is shown in FIG. 11 in which it is assumed that a blur correcting optical system consisting of a convex lens unit 103 is arranged behind an afocal optical system consisting of a convex lens unit 101 and a concave lens unit 102. This correcting optical system 103 is held by a lens frame 104 as optical axis decentering means. The lens frame 104 is so supported as to be movable two-dimensionally in a plane perpendicular to the optical axis with respect to a fixed frame 105. An image on an image formation surface 106 is moved by the movement of the correcting optical system 103.

An angular deviation meter 107 for detecting a camera shake outputs an angular shake occurring in a camera, i.e., an angular deviation signal θ. This angular deviation signal θ is converted into an image blur correcting deviation signal $\underline{d}$ by a coefficient converter 108, and this image blur correcting deviation signal $\underline{d}$ is supplied to an actuator 109 via an operational amplifier 111. In accordance with the image blur correcting deviation signal $\underline{d}$ supplied, the actuator 109 operates to shift the lens frame 104.

A position sensor 110 constituting position detecting means for detecting an actual positional deviation of the lens frame 104 constitutes a feedback loop in which a signal $d_L$ from the position sensor 110 is fed back to the input system of the actuator 109 via the operational amplifier 111 to cause driving control of the lens frame 104 and the correcting optical system 103 to correspond to a vibration deviation.

With the above arrangement, since the lens frame 104 is so driven as to cancel image blur due to a camera shake, image blur correction can be performed.

Note that a camera shake causing image blur consists of two components, an up-and-down component (a component in the pitch direction) and a right-and-left component (a component in the yaw direction). Therefore, two sets of the angular deviation meters 107 and the operational amplifiers 111 are prepared to correct both the pitch shake and the yaw shake of a camera.

In the above conventional example, however, the correcting optical system 103 is movable within a predetermined range, e.g., $\pm d_0$ with respect to the optical axis, so a space of at least $d_0$ must be provided between the lens frame 104 and the fixed frame 105. Therefore, an unnecessary light ray L not contributing to image formation may reach the image formation surface 106 through the space $d_0$.

Note that in the case of a single lens with a fixed focal length as in the above conventional example, it is relatively easy to form a lens arrangement which does not allow incidence of the unnecessary light ray L onto the image formation surface 106. In the case of a zoom lens, however, there is a high possibility that the unnecessary light ray reaches the image formation surface 106.

FIG. 12 shows a zoom-type image blur correcting optical system in which in a zooming operation from Wide to Tele, first to third lens units are moved as illustrated, whereas a fourth lens unit and a diaphragm 112 are kept fixed. An image on an image formation surface 106 is moved by shifting the second lens unit, thereby correcting image blur.

Note that since the second lens unit is moved in the direction of optical axis in the zooming operation, mechanical members, such as a lens frame 104, a fixed frame 105, and an actuator, are also moved together in the optical axis direction.

In this arrangement, an unnecessary light ray passing between the lens frame 104 and the fixed frame 105 is $L_W$ at the Wide end and $L_T$ at the Tele end. The light ray $L_W$ reaches a position outside the image formation surface 106, and the light ray $L_T$ is interrupted by a frame (not shown) for holding the third lens unit; neither of the light rays reach the image formation surface 106.

Note that FIG. 12 demonstrates unnecessary light rays at the time the correcting optical system 103 is located at the origin. Therefore, even if no unnecessary light ray reaches the image formation surface in this condition, when the correcting optical system 103 is shifted in image blur correction, a space on the side opposite to the direction of shift is increased, and this allows the unnecessary light ray $L_W$ or $L_T$ to reach the image formation surface to produce a ghost.

The unnecessary light ray $L_W$ or $L_T$ introduces another problem that it penetrates as stray light into the image blur correcting optical mechanism and is incident on a light-receiving element (to be described later) as a position detecting means of the correcting optical system. This causes an error in an output from the light-receiving element, and the result is a reduction in image blur correction accuracy. One related art is disclosed in U.S. Pat. No. 4,907,868.

SUMMARY OF THE INVENTION

It is an object of the present invention to solve the above conventional problems and provide an image blur correcting apparatus having good optical characteristics.

More particularly, it is an object of the present invention to suppress a change in peripheral light quantity upon movement of a correcting lens unit and provide a space for movement of the correcting lens unit while preventing penetration of stray light through this space.

DETAILED DESCRIPTION OF THE PREFERRED EMBODIMENTS

Figure 1A:
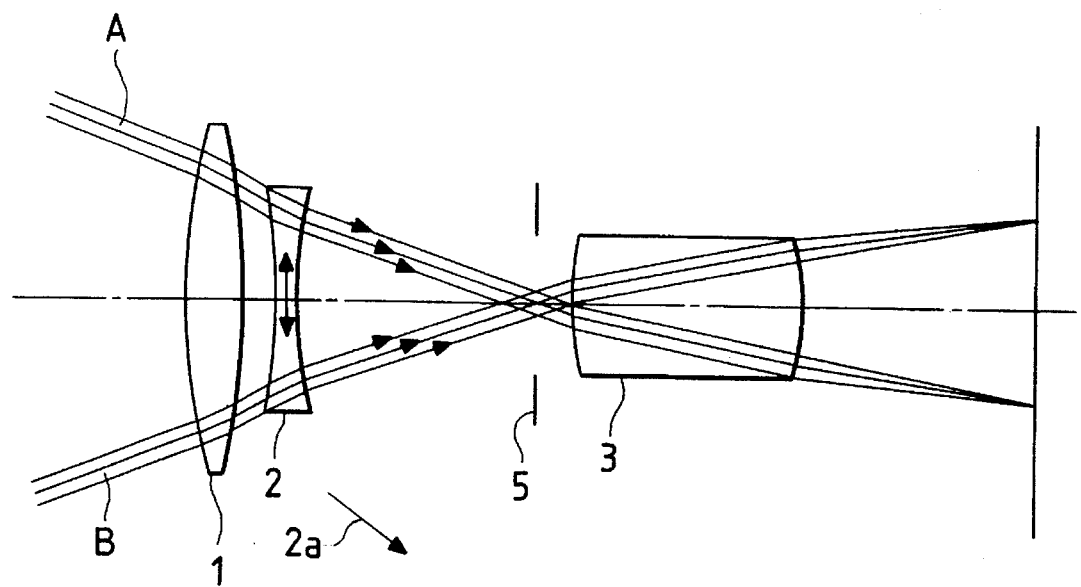
FIGS. 1A and 1B are schematic views showing a main part of an optical system according to the first embodiment of the present invention.
Figure 1B:
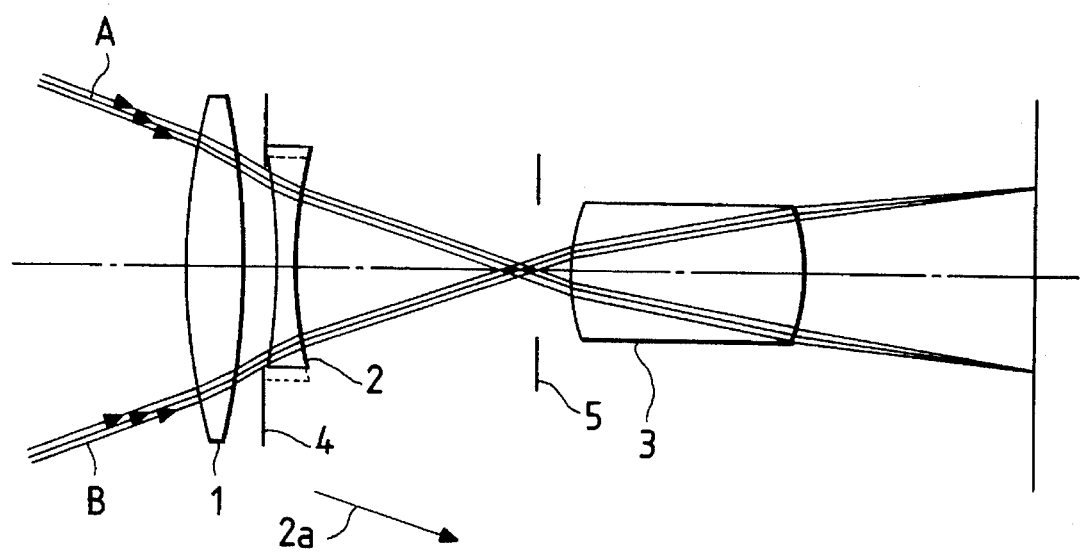
Figure 9A:
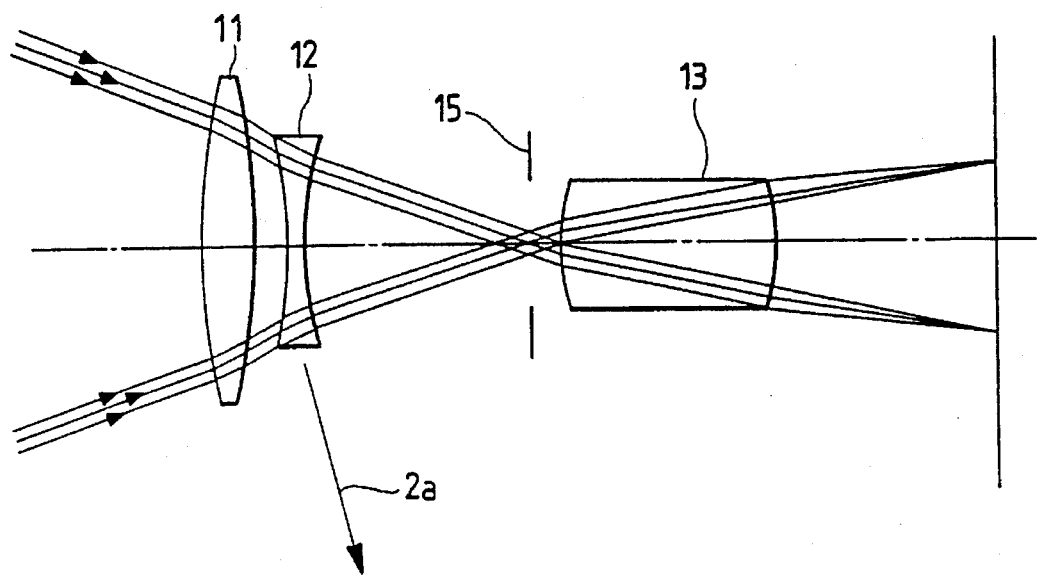
FIGS. 9A and 9B are schematic views showing an optical system of a conventional zoom lens.
Figure 9B:
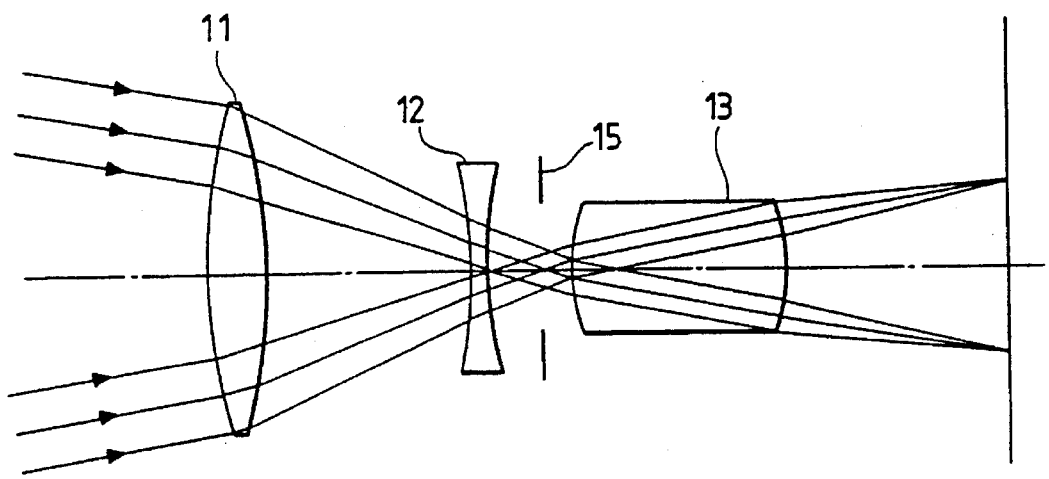
Figure 10:
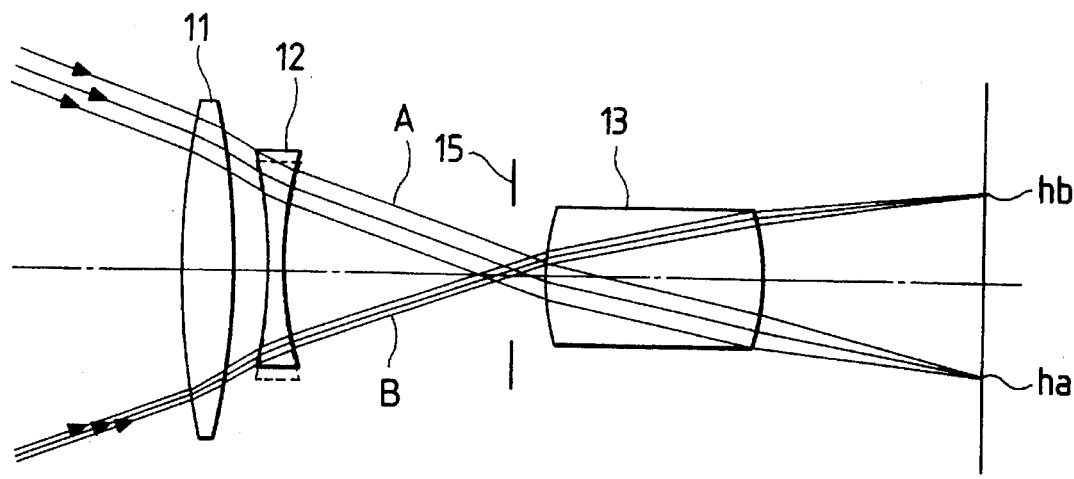
FIG. 10 is a schematic view for explaining a condition in which a partial lens unit of the arrangement shown in FIGS. 9A and 9B is moved.
Figure 11:
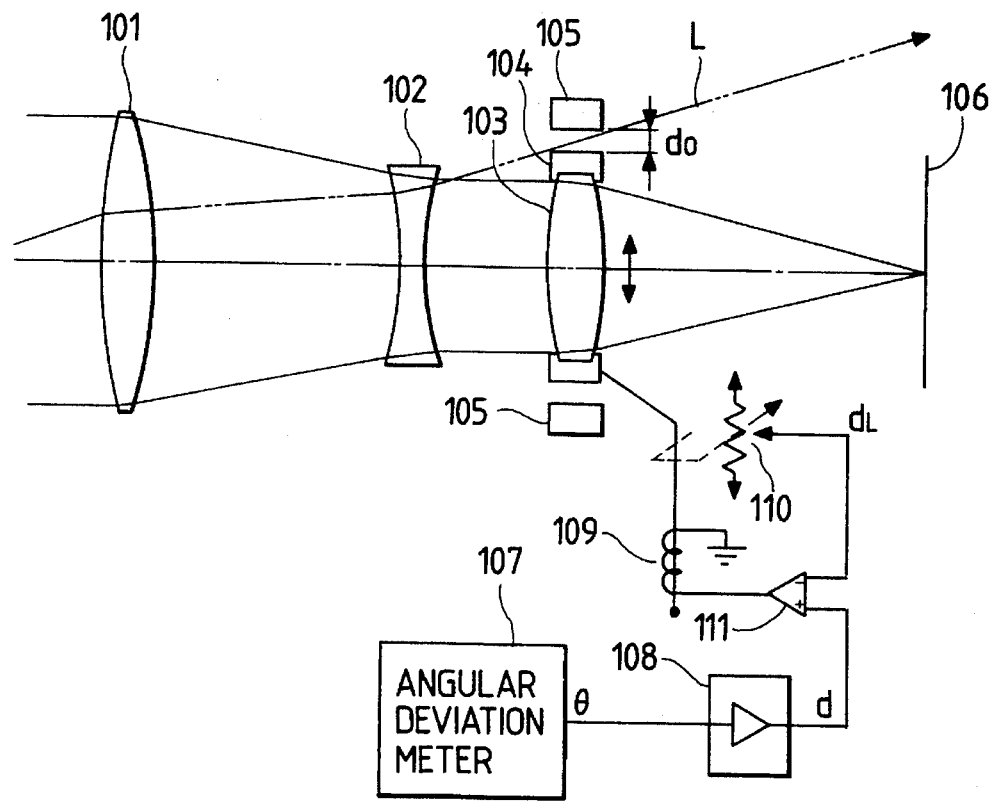
FIG. 11 is a schematic view showing the principle of a conventional image blur correcting apparatus.
Figure 12:
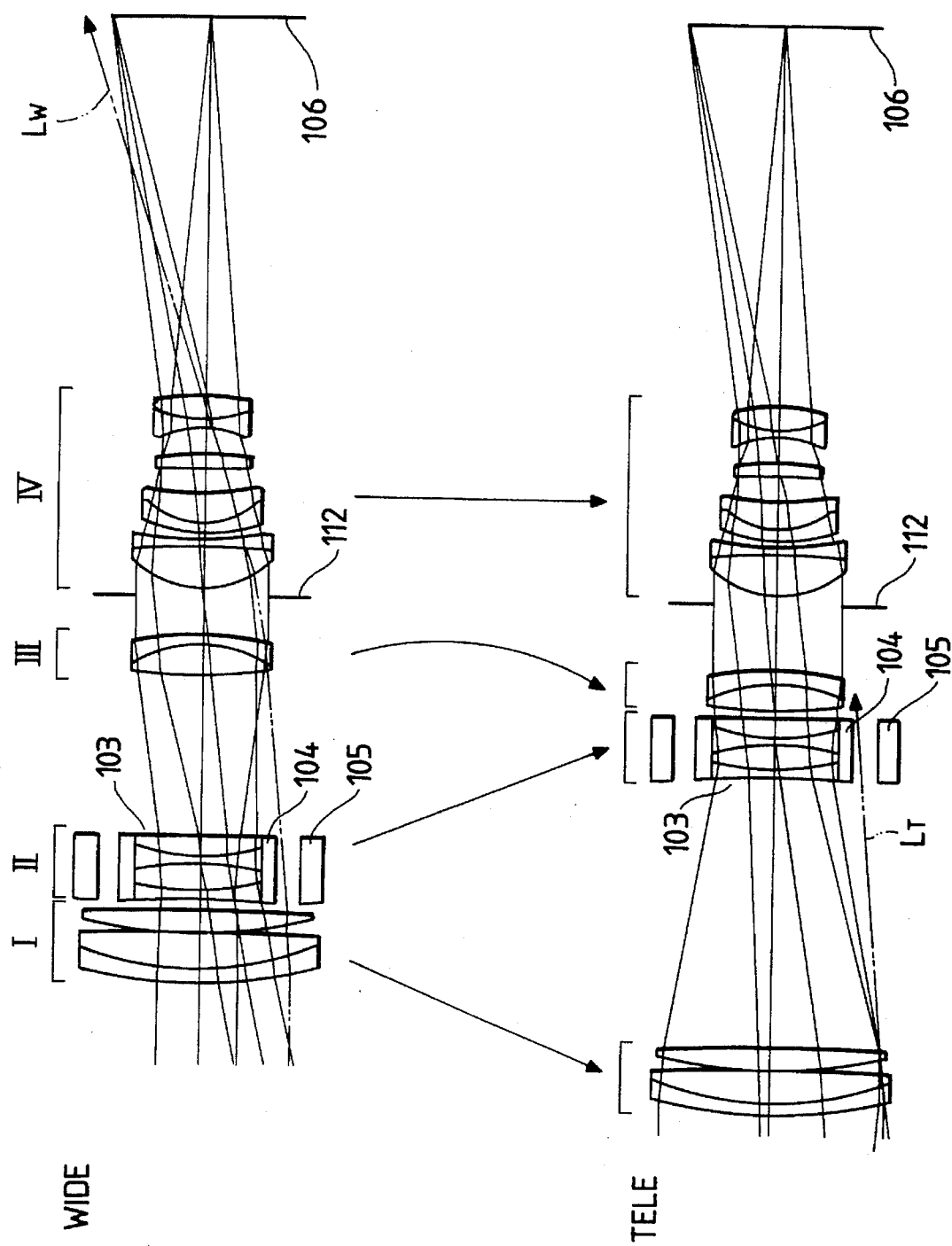
FIG. 12 is a schematic view for explaining stray light in a conventional image blur correcting apparatus.

FIGS. 1A and 1B are schematic views showing a main part of an optical system according to the first embodiment of the present invention, in each of which light beams passing through individual lens units are illustrated. FIG. 1A shows a normal photographing condition, and FIG. 1B shows a condition in which a correcting lens unit 2 is moved in a direction perpendicular to the optical axis to correct blur of a photographed image. Note that the arrangement shown in FIGS. 1A and 1B employs a zoom lens of the same type as the zoom lens shown in FIG. 9 as a photographing lens.

That is, a magnification change from a wide-angle end to a telephoto end is performed by moving the lens unit 2 linearly toward an image surface along the optical axis as indicated by an arrow 2a, and a variation in the image surface caused by the magnification change is corrected by moving a lens unit 1 nonlinearly along the optical axis. In addition, to correct blur of a photographed image, the correcting lens unit 2 is moved in a direction perpendicular to the optical axis.

A light-shielding member 4 having a circular aperture with a predetermined diameter is arranged (on the side of an object to be photographed) immediately before the correcting lens unit 2. In changing the magnification, the light-shielding member 4 is moved together with the correcting lens unit 2 in the direction of optical axis but kept stationary in a direction perpendicular to the optical axis. Note that practical arrangements of this light-shielding member will be described later with reference to FIG. 13 and the subsequent drawings. Note also that the arrangement in FIGS. 1A and 1B also includes a diaphragm 5 having a variable aperture for determining an f-number and a relay lens unit 3 kept fixed during the magnification change.

The zoom lens of this embodiment is arranged such that light beams outside the optical axis are regulated by the effective diameter of the correcting lens unit 2 in a zoom position at the wide-angle end. For this reason, the aperture diameter of the light-shielding member 4 is determined such that quantities of light in peripheral portions of a screen become substantially equal to each other when the light-shielding member 4 is located closer to an object to be photographed than the correcting lens unit 2 in the zoom position at the wide-angle end.

When the correcting lens unit 2 is moved from the position shown in FIG. 1A to the position shown in FIG. 1B in a direction perpendicular to the optical axis in order to stabilize an image, a portion of a lower light beam A of light beams outside the optical axis is cut by the light-shielding member 4 so that the light quantity of the lower light beam A becomes substantially equal to that of an upper light beam B. In this manner, the light quantities in the peripheral portions of the screen are well balanced.

In this embodiment, as described above, the zoom position in which light beams outside the optical axis are regulated by the effective diameter of the correcting lens unit is used as a reference position. When the correcting lens unit is moved to correct blur of a photographed image in this reference zoom position, a difference in light quantity between the peripheral portions of the screen caused by light beams eclipsed by the correcting lens unit is corrected by the light-shielding member.

Figure 2:
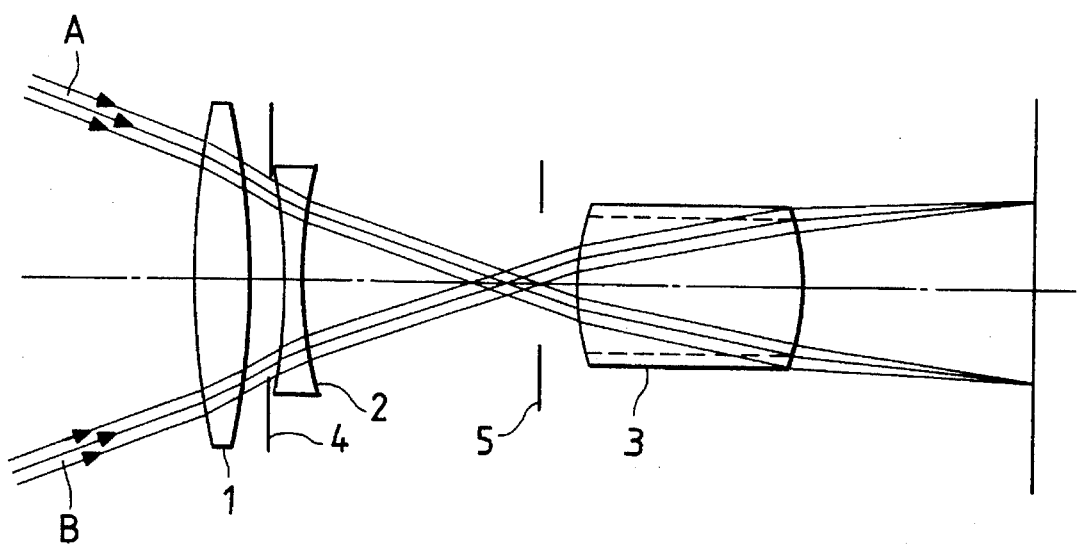
FIG. 2 is a schematic view for explaining a condition in which a part of the arrangement shown in FIGS. 1A and 1B is altered.

Note that in order to increase the light quantities in the peripheral portions of the screen in this embodiment, it is preferable to increase the effective diameter of the relay lens unit 3 behind the diaphragm 5, as shown in FIG. 2.

Figure 3:
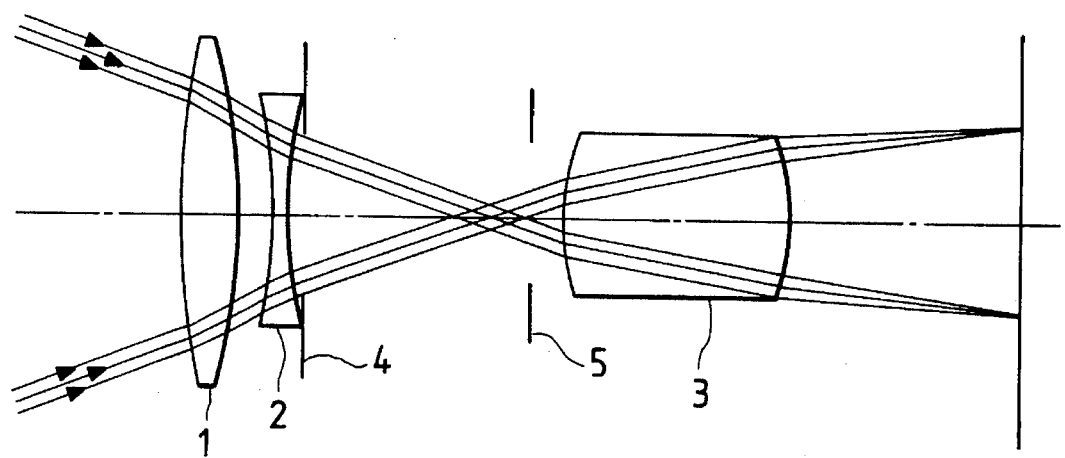
FIG. 3 is a schematic view showing a main part of an optical system according to the second embodiment of the present invention.

FIG. 3 is a schematic view showing a main part of an optical system according to the second embodiment of the present invention, in which light beams passing through individual lens units are illustrated. This embodiment is the same as the first embodiment shown in FIGS. 1A and 1B except that a light-shielding member 4 is arranged (immediately after a correcting lens unit 2) between the correcting lens unit 2 and a diaphragm 5.

Figure 4:
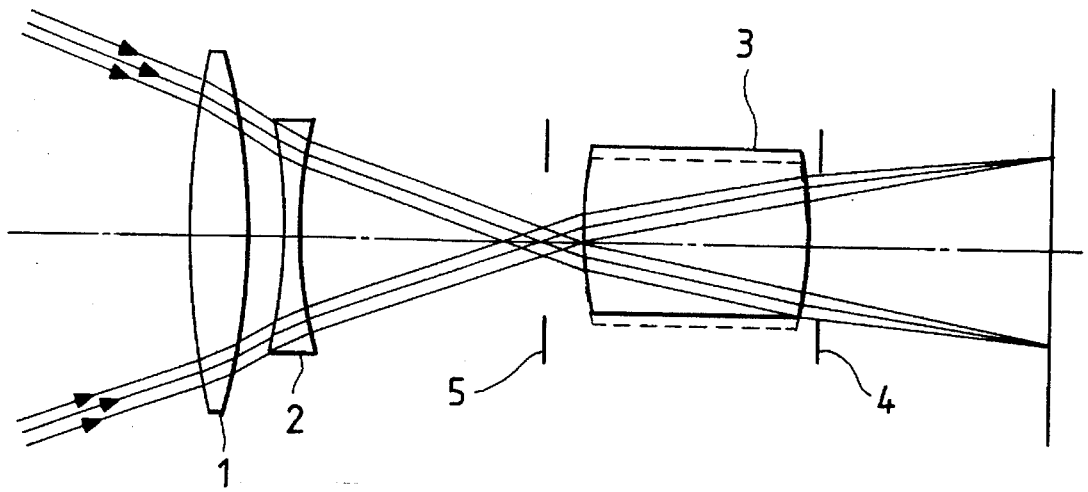
FIG. 4 is a schematic view showing a main part of an optical system according to the third embodiment of the present invention.

FIG. 4 is a schematic view showing a main part of an optical system according to the third embodiment of the present invention, in which light beams passing through individual lens units are illustrated. This embodiment is the same as the first embodiment shown in FIGS. 1A and 1B except that a correcting lens unit 3 is arranged to be movable and moved in a direction perpendicular to the optical axis and a light-shielding member 4 is fixed at a position (on the side of an image surface) immediately after the correcting lens unit 3.

Figure 5A:
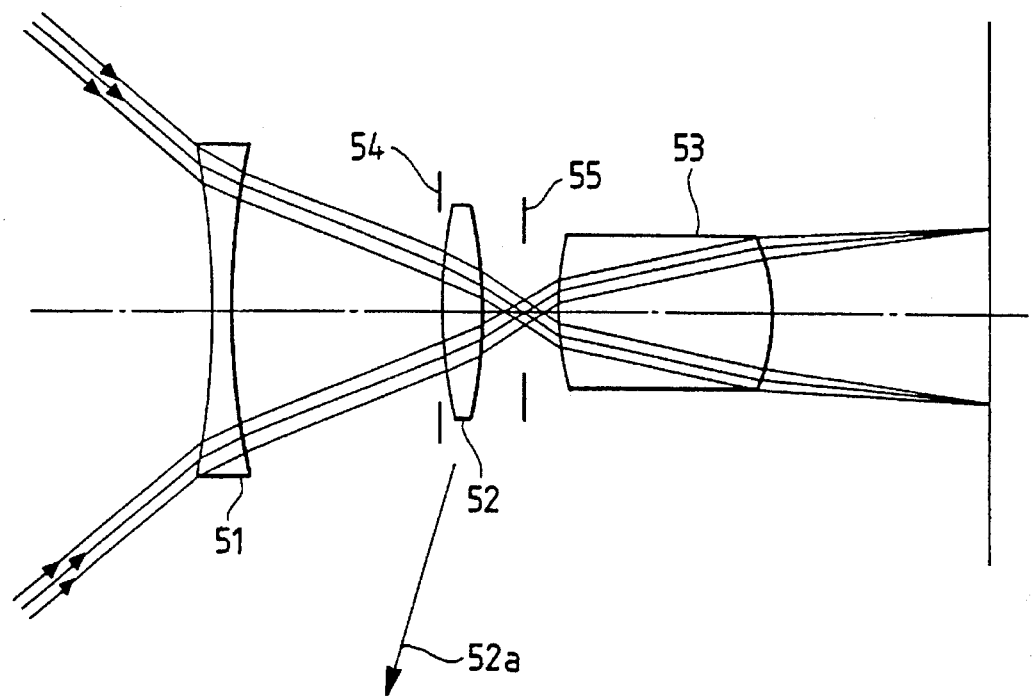
FIGS. 5A and 5B are schematic views showing a main part according to the fourth embodiment of the present invention.
Figure 5B:
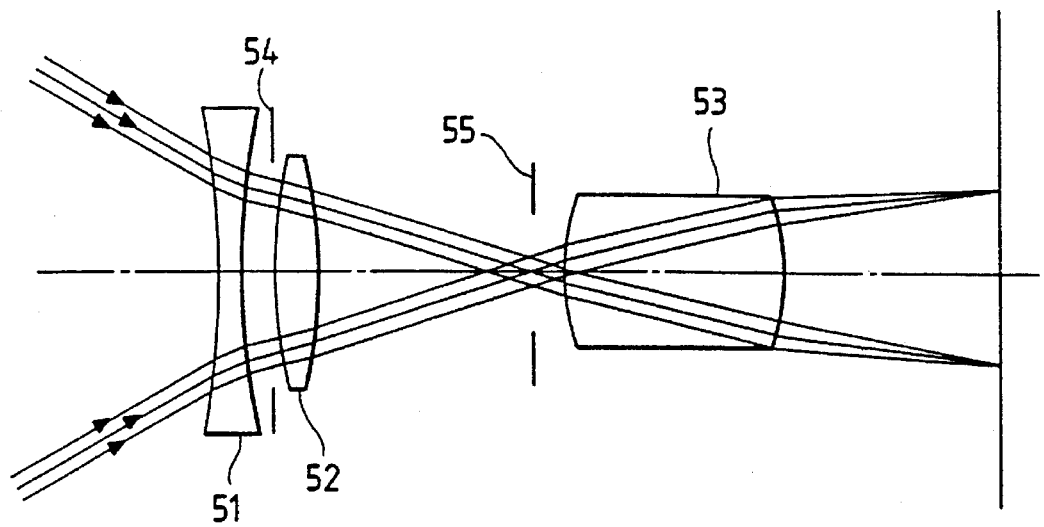

FIGS. 5A and 5B are schematic views showing a main part of an optical system according to the fourth embodiment of the present invention, in each of which light beams passing through individual lens units are illustrated. FIG. 5A shows a zoom position at a wide-angle end, and FIG. 5B shows a zoom position at a telephoto end.

In this embodiment, a magnification change from the wide-angle end to the telephoto end is performed by moving a lens unit 52 linearly toward an object to be photographed along the optical axis as indicated by an arrow 52a, and a variation in an image surface caused by the magnification change is corrected by moving a lens unit 51 nonlinearly along the optical axis. In addition, to correct blur of a photographed image, the correcting lens unit 52 is moved in a direction perpendicular to the optical axis.

A light-shielding member 54 having a predetermined aperture diameter is arranged immediately before the correcting lens unit 52. In changing the magnification, the light-shielding member 54 is moved together with the correcting lens unit 52 in the optical axis direction. Note that the arrangement shown in FIG. 5 also includes a diaphragm 55 having a variable aperture diameter and a relay lens unit 53 kept fixed during the magnification change.

The zoom lens of this embodiment is arranged such that light beams outside the optical axis are regulated by the effective diameter of the correcting lens unit 52 in the zoom position at the telephoto end, as shown in FIG. 5B. For this reason, the light-shielding diameter of the light-shielding member 54 is determined such that quantities of light in peripheral portions of a screen become substantially equal to each other when the light-shielding member 54 is located closer to an object to be photographed than the correcting lens unit 52 in the zoom position at the telephoto end.

Figure 6:
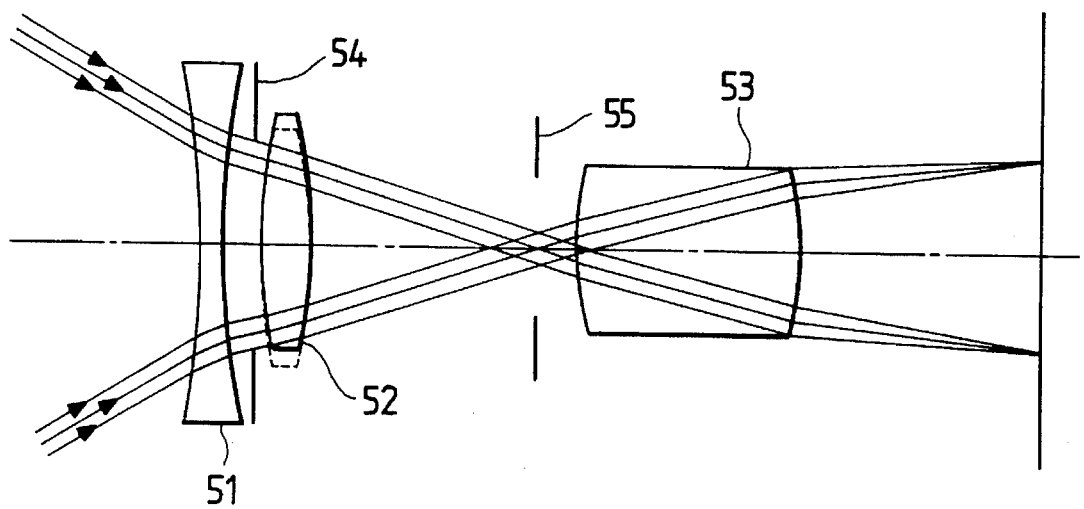
FIG. 6 is a schematic view for explaining a condition in which a partial lens unit of the arrangement shown in FIGS. 5A and 5B is moved.

FIG. 6 illustrates a condition in which, in the position shown in FIG. 5B, the correcting lens unit 52 is moved in a direction perpendicular to the optical axis to correct blur of a photographed image. In this condition, a portion of a lower light beam A of light beams outside the optical axis is cut by the light-shielding member 54 so that the light quantity of the lower light beam A becomes substantially equal to that of an upper light beam B. In this manner, the light quantities in the peripheral portions of the screen are well balanced.

Figure 7:
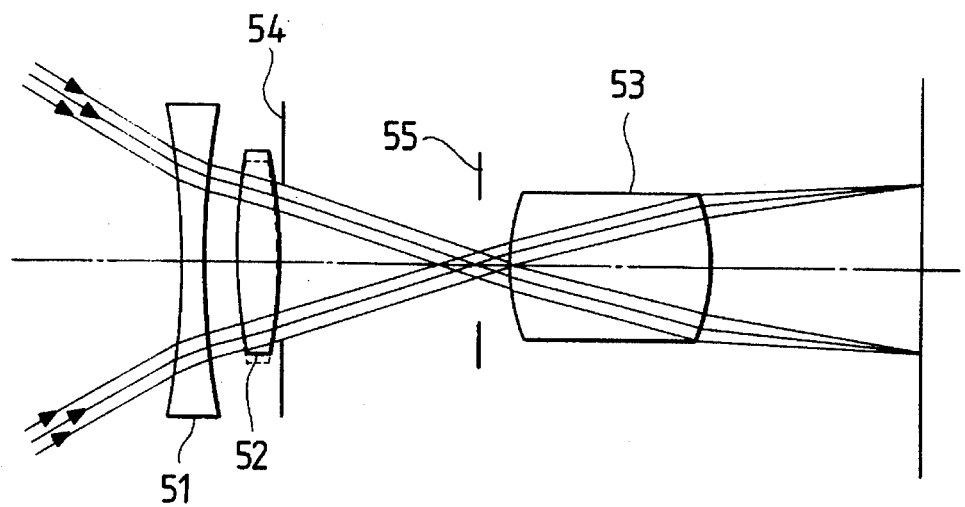
FIG. 7 is a schematic view showing a main part of an optical system according to the fifth embodiment of the present invention.

FIG. 7 is a schematic View showing a main part of an optical system according to the fifth embodiment of the present invention, in which light beams passing through individual lens units are illustrated.

This embodiment is the same as the fourth embodiment shown in FIG. 6 except that a light-shielding member 54 is arranged (immediately after a correcting lens unit 52) between the correcting lens unit 52 and a diaphragm 55.

Figure 8:
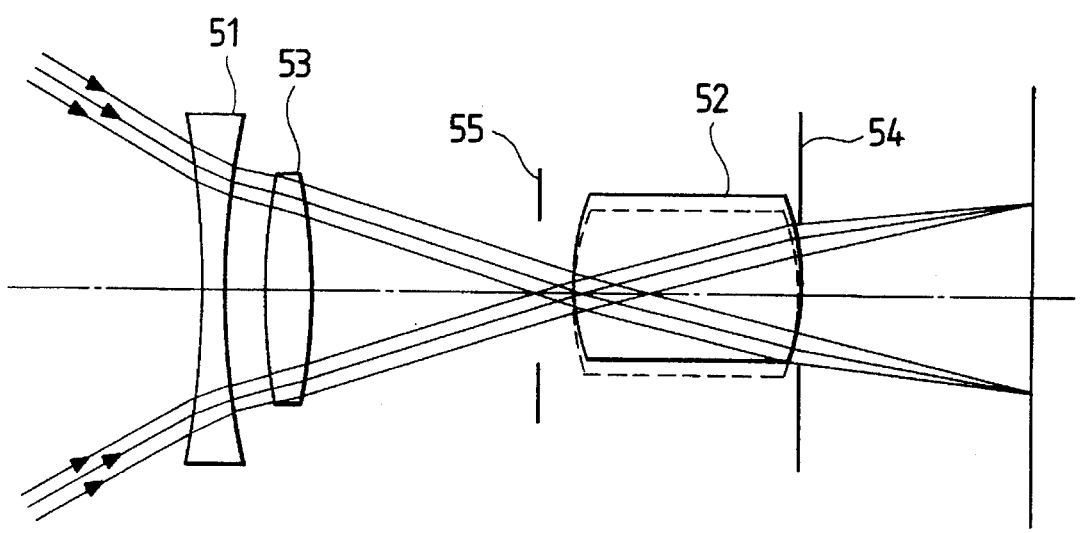
FIG. 8 is a schematic view showing a main part of an optical system according to the sixth embodiment of the present invention.

FIG. 8 is a schematic view showing a main part of an optical system according to the sixth embodiment of the present invention, in which light beams passing through individual lens units are illustrated.

This embodiment is the same as the fourth embodiment shown in FIG. 6 except that a lens unit 53 is used as a correcting lens unit movable in a direction perpendicular to the optical axis and a light-shielding member 54 is fixed at a position (on the side of an image surface) immediately after the correcting lens unit 53.

In each of the above embodiments, a zoom lens is taken as an example of the photographing lens. However, the present invention is similarly applicable to a system in which a photographing lens is of a fixed focal length type.

According to the present invention as described above, a lens unit as a part of a photographing lens having a plurality of lens units is used as a correcting lens unit, and this correcting lens unit is decentered in a direction perpendicular to the optical axis to correct blur of a photographed image. In this case, a light-shielding member having a predetermined aperture diameter is used to prevent degradation in characteristics caused by a difference in quantity of light between partial peripheral portions of a screen due to the decentering of the correcting lens unit. As a result, a well-balanced light quantity distribution can be obtained, and this consequently achieves a blur correcting apparatus capable of forming a high-quality image.

Practical arrangements of the above light-shielding member will be described below.

Figure 13:
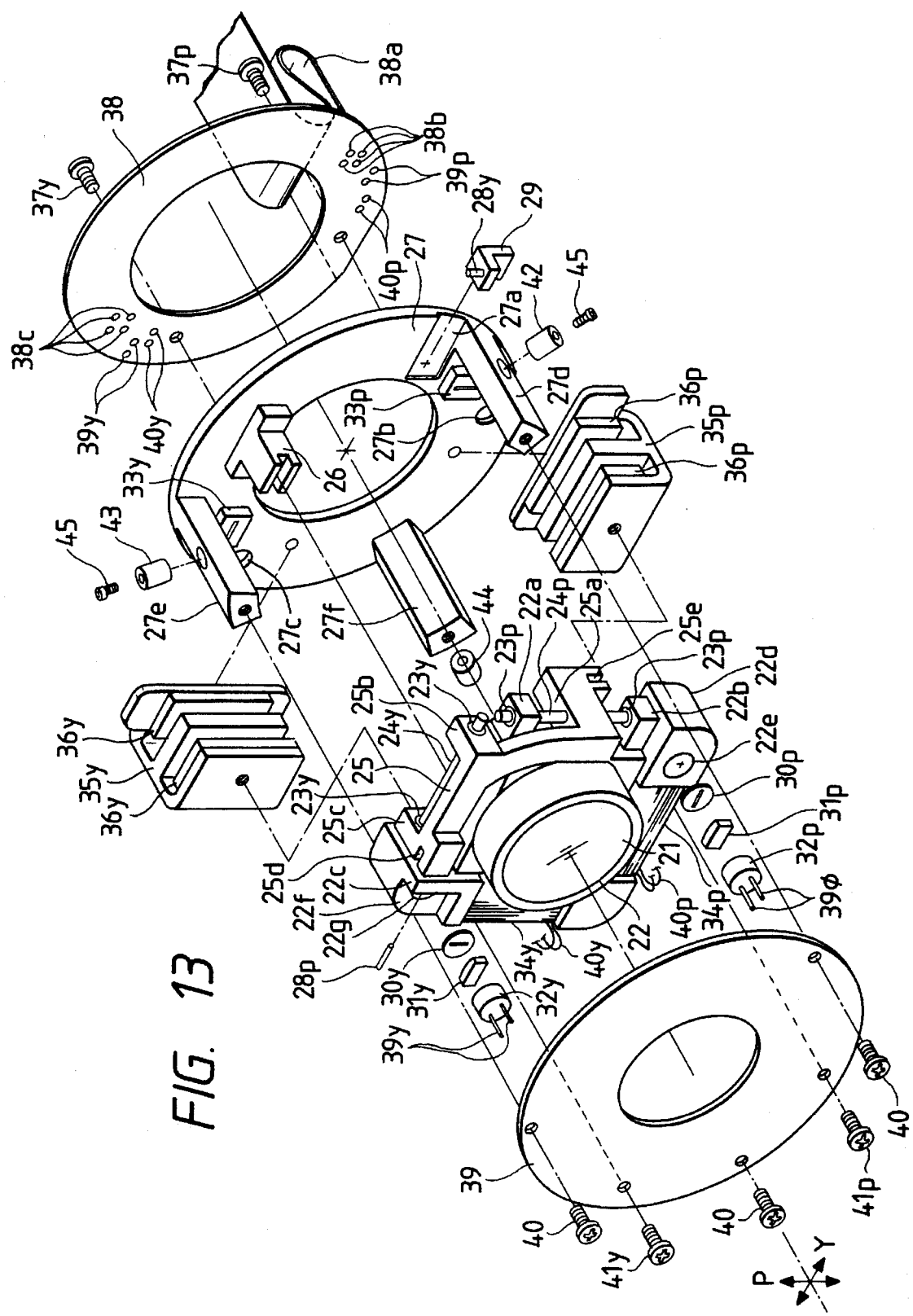
FIG. 13 is an exploded perspective view showing an image blur correcting apparatus according to the present invention.

FIGS. 13 to 16 show still another embodiment of the present invention, in which FIG. 13 best illustrates the characteristic of the present invention. Referring to FIG. 13, a lens holding frame 22 for holding a correcting lens unit 21 (corresponding to the lens unit 2 of FIGS. 1A and 1B) can slide on a pitch slide shaft $24p$ via slide bearings $23p$ fixed in arm-like projections 22a and 22b and consisting of a polyacetal resin or the like. The pitch slide shaft 24p is fixed in a projection 25a of an intermediate arm 25.

The intermediate arm 25 can slide on a yaw slide shaft 24y via slide bearings 23y fixed in other projections 25b and 25c. The yaw slide shaft 24y is fixed on a yaw holding table 26, and the yaw holding table 26 is fixed on a fixed frame 27.

A pitch guide pin 28p extends vertically from a projection 22c of the lens holding frame 22. Since this pitch guide pin 28p slides in the pitch direction while being fitted in a guide groove 25d of the intermediate arm, a fall of the lens holding frame 22 is prevented; the lens holding frame 22 is allowed to move parallel in only the pitch direction.

A yaw guide pin 28y is fixed in a recessed portion 27a of the fixed frame 27 via a base 29. The yaw guide pin 28y is fitted in a guide groove 25e of the intermediate arm 25. This prevents a fall of the intermediate arm 25, and the intermediate arm 25 is allowed to move parallel in only the yaw direction.

With the above arrangement, the lens holding frame 22 is slidable in the pitch direction with respect to the intermediate arm 25, and the intermediate arm 25 is slidable in the yaw direction with respect to the fixed frame 27. Therefore, the lens holding frame 22 and the correcting lens unit 21 can move in both the pitch and yaw directions with respect to the fixed frame 27 and are prevented from moving in other directions.

A mechanism for detecting deviations of the lens holding frame 22 in the pitch and yaw directions will be described below. A slit 30p, a condenser lens 31p, and an infrared-emitting diode (IRED) 32p are embedded in a hole 22e formed in a projection 22d of the lens holding frame 22. A pitch-direction position sensing device (PSD) 33p is arranged at a position on the fixed frame 27 opposite to the IRED 32p.

Near-infrared light emitted from the IRED 32p is projected onto the PSD 33p through the slit 30p, and the PSD 33p outputs a signal corresponding to the position of the projected light. As a result, a deviation of the lens holding frame in the pitch direction is detected. Likewise, a yaw-direction deviation of the lends holding frame 22 is detected by a slit 30y, a condenser lens 31y, and an IRED 32y embedded in a hole 22g of a projection 22f at the diagonal position of the lens holding frame 22, and a PSD 33y on the fixed frame 27.

A mechanism for generating forces for driving the lens holding frame 22 in the pitch and yaw directions will be described. Coils 34p and 34y are fixed on the lens holding frame 22, and a magnetic circuit constituted by yokes 35p and 35y and permanent magnets 36p and 36y is fixed on the fixed frame 27 via screws 37p and 37y. The coils 34p and 34y inserted into the gap of the magnetic circuit are energized to give thrusts in the pitch and yaw directions to the lens holding frame 22.

A flexible printed circuit board 38 includes driving circuits for the IREDs 32p and 32y, signal processing circuits for the PSDs 33p and 33y, and drive control circuits for the coils 34p and 34y. The flexible printed circuit board 38 is attached to the fixed frame 27 by using the screws 37p and 37y.

Note that since the IREDs 32p and 32y and the coils 34p and 34y are mounted on the lens holding frame 22 as a moving part, the IREDs 32p and 32y and the coils 34p and 34y are connected to the lower surface side of the flexible printed circuit board 38 through flexible power-supply wires 39p and 39y, and 40p and 40y, respectively.

On the other hand, the PSDs 33p and 33y are arranged on the fixed frame 27 as a stationary part. Therefore, the lead portions of the PSDs 33p and 33y are soldered directly to the lower surface side of the flexible printed circuit board 38 through holes 38b and 38c, respectively, formed in the flexible printed circuit board 38. Since the flexible printed circuit board 38 moves together with the correcting optical mechanism in the direction of optical axis in zooming operation, it has a bent portion 38a for absorbing this movement. The flexible printed circuit board 38 is connected to a circuit board on the side of the lens or the camera body via the bent portion 38a.

A light-shielding plate (light-shielding member) 39 (corresponding to the light-shielding member 4 in FIGS. 1A and 1B) having a predetermined aperture diameter shields harmful light beams passing through a space $d_S$ (see FIG. 14) between the lens holding frame 22 and the fixed frame 27 and at the same time prevents the individual parts of the blur correcting optical mechanism from being seen from the front of the photographing lens. The light-shielding plate 39 is mounted on three projections 27d, 27e, and 27f on the fixed plate 27 by screws 40. The light-shielding plate 39 also has a function of ensuring rigidity of the correcting optical mechanism as a whole.

When the coils 34p and 34y are energized, these coils 34p and 34y receive force from the magnetic circuit consisting of the yokes 35p and 35y and the permanent magnets 36p and 36y. At the same time, this magnetic circuit is also applied with force by a reaction when the coils 34p and 34y are energized. As a result, the plate-like fixed frame 27 supporting the yokes 36p and 36y causes deflection to produce harmful vibrations throughout the mechanical portion.

For this reason, a cage-like structure is formed by the disc portion and the projections 27d, 27e, and 27f of the fixed frame 27 and the light-shielding plate 39, thereby increasing the rigidity of the entire mechanical portion. In addition, to prevent deflection of the yokes 35p and 35y, the yokes 35p and 35y are coupled to the light-shielding plate 39 via screws 41p and 41y to thereby further increase the rigidity.

The image blur correcting optical mechanism having the above arrangement drives the correcting lens unit 21 in the pitch and yaw directions to correct image blur caused by a camera shake. In this embodiment, since the lens unit 21 and the correcting optical mechanism move along the optical axis in zooming, driven pins 42, 43, and 44 are fixed to the side surfaces of the projections 27d, 27e, and 27f, respectively, by screws 45 to extend vertically therefrom. The pins 42, 43, and 44 are spaced at a phase difference of 120°. Each pin engages with a zoom driving cam shown in FIG. 14, and the fixed frame 27, i.e., the correcting lens unit 21 is moved in the optical axis direction by rotation of a cam cylinder having that cam, thereby performing zooming.

Figure 14:
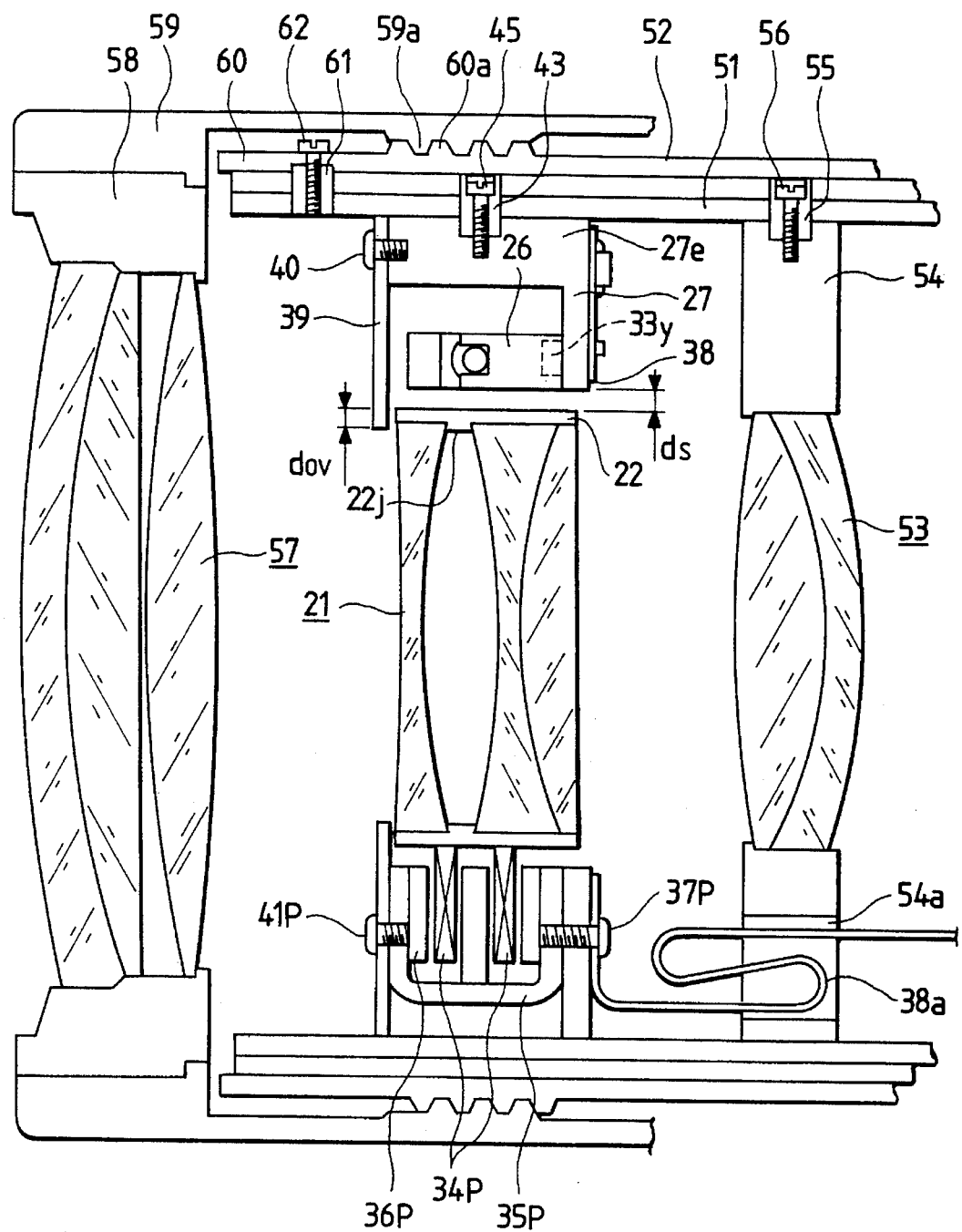
FIG. 14 is a sectional view showing a main part of the apparatus shown in FIG. 13.

In FIG. 14 showing the sectional view of this embodiment, a fixed cylinder 51 has a straight-drive groove to be engaged with the pin 43, and a cam cylinder 52 has a curved cam groove to be engaged with the pin 43. When the cam cylinder 52 is rotated, the pin 43 and the fixed frame 27 are moved forward or backward in the direction of optical axis.

A lens holding frame 54 holds a third lens unit 53. A pin 55 fixed to the lens holding frame 54 by a screw 56 to extend vertically therefrom is fitted in the straight-drive groove of the fixed cylinder 51 and in the cam groove of the cam cylinder 52. A lens holding frame 58 holds a first lens unit 57. The lens holding frame 58 is mounted on a helicoidal cylinder 59 having a helicoidal screw 59a. A straight-drive cylinder 60 has a helicoidal screw 60a. A pin 61 is fixed to the inner wall of the straight-drive cylinder 60 by a screw 62 to extend vertically therefrom. The pin 61 is fitted in the straight-drive groove of the fixed cylinder 51 and the cam groove of the cam cylinder 52.

The operation of the above embodiment will be described below. When the cam cylinder 52 is rotated, the fixed frame 27, the lens holding frame 54, and the straight-drive cylinder 60 are moved forward or backward by a predetermined amount in the direction of optical axis by the three cam grooves formed on the cam cylinder 52, thereby performing zooming. When the helicoidal cylinder 59 is rotated, the first lens unit 57 is moved forward or backward in the optical axis direction to perform focusing.

The bent portion 38a of the flexible printed circuit board 38 is stored in a hole 54a formed in the lower portion of the lens holding frame 54. The bent portion 38a absorbs movement of the flexible printed circuit board 38 when the blur correcting optical mechanism moves in the optical axis direction.

The operation of the light-shielding plate 39 will be described below with reference to FIG. 14. When the correcting lens unit 21 is not shifted, the space $d_S$ is formed between the lens holding frame 22 and the fixed frame 27. Assuming that the correcting lens unit 21 can be shifted to this space $d_S$, direct light beams passing through the space $d_S$ can be shielded if an overlap amount $d_{OV}$ of the inner diameter of the light-shielding plate 39 and the outer diameter of the lens holding frame 22 satisfies a relation that $d_{OV} > d_S$.

As the overlap amount $d_{OV}$ is increased, light-shielding stability can be improved, but effective light beams are also shielded. Therefore, it is desirable that the overlap amount $d_{OV}$ be set slightly larger than the space $d_S$.

Figure 15:
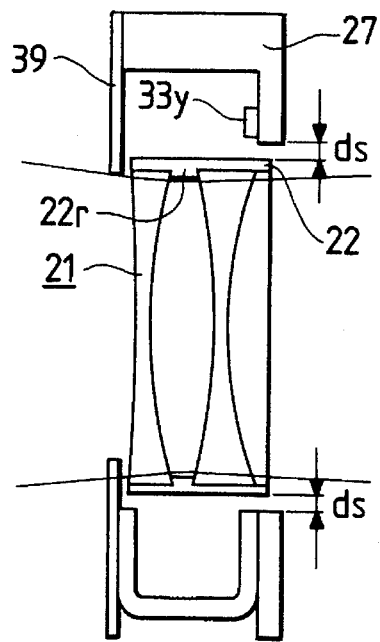
FIG. 15 is a view for explaining the operation of still another embodiment of the present invention.
Figure 16:
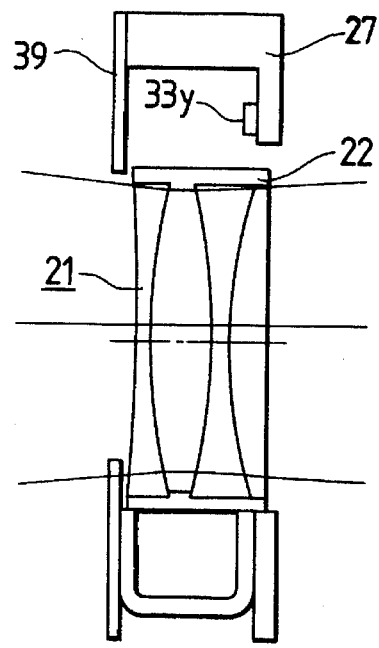
FIG. 16 is a view for explaining the operation of the embodiment in FIG. 15.

FIG. 15 shows a condition in which the correcting lens unit 21 is located at the origin, i.e., the center, and FIG. 16 shows a condition in which the correcting lens unit 21 is shifted downward in the drawing surface, i.e., in the pitch direction by an amount of the space $d_S$.

Referring to FIG. 15, all light beams incident on the correcting lens unit 21 are regulated by the light-shielding plate 39. In FIG. 16, however, the upper portion of the incident light beams is regulated by the effective diameter of the correcting lens unit 21, and the lower portion of the beams is regulated by the light-shielding plate 39.

In either case, therefore, no harmful light enters behind the light-shielding plate 39, and this prevents incidence of harmful light onto the image formation surface or the PSD 33y.

In this embodiment, the size of the light-shielding plate 39 has a minimum necessary overlap amount $d_{OV}$ capable of covering the space between the lens holding frame 22 and the fixed frame 27. In the next embodiment, however, the size of an opening portion 71a of a light-shielding plate 71 is decreased intentionally to positively limit even effective light beams.

Figure 17:
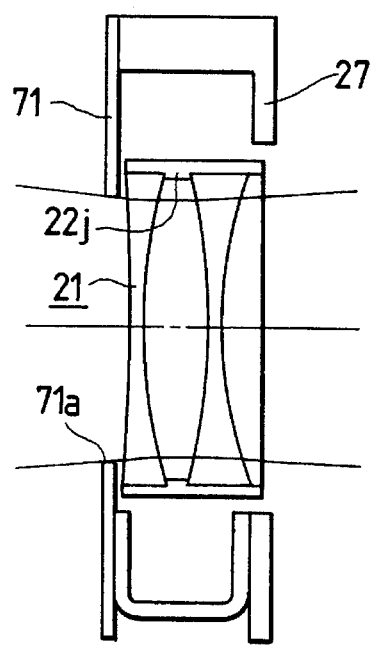
FIG. 17 is a view for explaining the operation of still another embodiment of the present invention.
Figure 18:
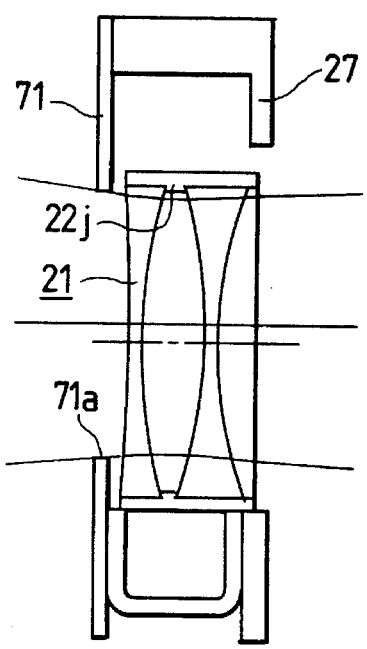
FIG. 18 is a view for explaining the operation of the embodiment shown in FIG. 17.

FIGS. 17 and 18 are views for explaining operations corresponding to FIGS. 15 and 16, respectively, in which the arrangement except a light-shielding plate is the same as the above embodiment. Therefore, the same reference numerals as in FIGS. 15 and 16 denote the same parts in FIGS. 17 and 18, and a detailed description thereof will be omitted.

As shown in FIG. 17, an opening portion of a light-shielding plate 71 is set smaller than the opening portion 39a of the light-shielding plate 39 according to the embodiment in FIG. 15. Hence, as shown in FIG. 18, even when a correcting lens unit 21 is shifted to the maximum stroke, light beams incident on the correcting lens unit 21 are regulated by the light-shielding plate 71.

In this embodiment, no effective light rays are incident on the outer peripheral portion of the correcting lens unit 21, i.e., a so-called "shingle" even if the correcting lens unit is shifted by the maximum amount, so diffused reflection by the "shingle" surface can be effectively prevented.

In the previous embodiments, the light-shielding plate 39 or 71 is mounted on the fixed frame 27. In the next embodiment, however, a light-shielding plate 72 is mounted on a lens holding frame 22.

Figure 19:
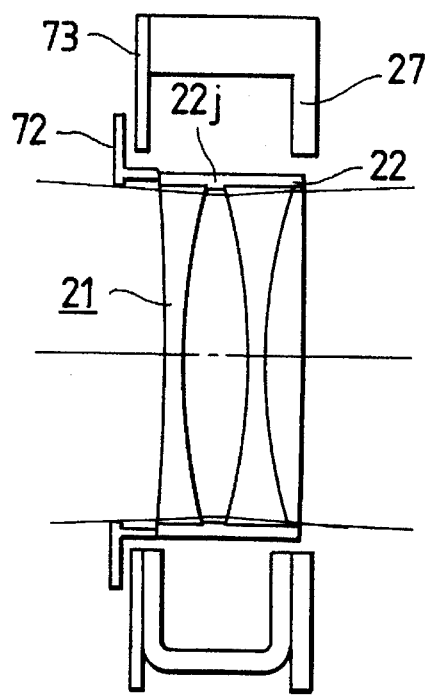
FIG. 19 is a view for explaining the operation of still another embodiment of the present invention.
Figure 20:
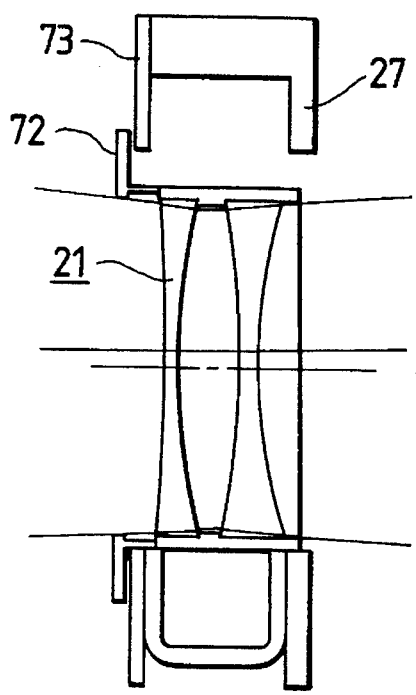
FIG. 20 is a view for explaining the operation of the embodiment shown in FIG. 19.

FIGS. 19 and 20 are views for explaining operations corresponding to FIGS. 15 and 16, respectively. In this embodiment, the first light-shielding plate 72 is provided on the lens holding frame 22. Regardless of the shift amount of a correcting lens unit 21, light beams incident on the correcting lens unit 21 are limited by the first light-shielding plate 72 or a glass abutment portion 22j of the lens holding frame 22.

A second light-shielding plate 73 is provided on a fixed frame 27 in order to ensure rigidity of an image blur correcting optical mechanism and shield the individual internal parts. Instead of using this second light-shielding plate 73, the outer diameter of the first light-shielding plate 72 may be increased. In this case, however, the weight of the moving part more or less increases, so it is desirable that the first light-shielding plate 72 be made from a material with a low specific gravity.

Note that which of the above embodiments is employed may be determined by the characteristics of a correcting optical system of interest. That is, by calculating the aberration when the image blur correcting optical system is shifted for each of conditions in which the light beam limiting portion of the correcting optical system is fixed and shifted, an arrangement having a smaller aberration may be adopted.

In each of the above embodiments, the light-shielding plate 39 or 71 is arranged on the side of an object to be photographed with respect to the correcting lens unit 21. However, the light-shielding plate 39 or 71 may be arranged on the side of an image. In this case, the light-shielding plate 39 or 71 can be formed by the same member as the fixed frame 27. Alternatively, the fixed frame 27 may be arranged on the side of an object to be photographed to also serve as the light-shielding plate 39 or 71.

On the other hand, the first light-shielding plate 72 described above may be arranged on the side of an image with respect to the image blur correcting lens unit 21 or between the fixed frame 27 and the second light-shielding plate 73.

These light-shielding plates can also be placed on both sides of the correcting lens unit 21, i.e., on the sides of both an object to be photographed and an image.

According to the present invention, as has been described above, a light-shielding member for shielding light passing through a space formed between a lens holding frame and a fixed frame is arranged. This prevents incidence of harmful light rays to an image formation surface, and consequently a clear image free from ghost or flare can be obtained.

In addition, according to the present invention, a light-shielding member regulates light beams incident on or emerging from a correcting lens unit. This prevents incidence or penetration of harmful light rays onto an image formation surface or into an image blur correcting mechanism, thereby preventing incidence of stray light onto optical system position detecting means in the image blur correcting mechanism. Consequently, accurate image blur correction can be performed.

Furthermore, according to the present invention, there are provided a light-shielding member for shielding light passing through a space formed between a lens holding frame and a fixed frame and a light beam regulating member for regulating light beams incident on or emerging from a correcting optical system. This prevents incidence or penetration of harmful light rays onto an image formation surface or into an image blur correcting mechanism. In addition, by optimizing the arrangement or the aperture diameter of this light-shielding member in accordance with the characteristics of the optical system, it is possible to control generation of aberrations when the correcting optical system is shifted.

What is claimed is:

1. An image stabilizing apparatus comprising:
   a plurality of lens units for forming an image;
   holding means for holding said lens units;
   supporting means;
   driving means for driving said holding means with respect to said supporting means such that at least one lens unit is decentered from an optical axis; and
   light-shielding means for shielding light passing through a space formed when said holding means for holding said lens unit is driven by said driving means.

2. An apparatus according to claim 1, wherein said light-shielding means is provided on said supporting means.

3. An apparatus according to claim 1, wherein said lens unit to be driven is moved along the optical axis to perform zooming.

4. An apparatus according to claim 1, wherein said light-shielding means has a predetermined aperture diameter.

5. An apparatus according to claim 2, wherein said light-shielding means regulates light beams incident on or emerging from said lens unit to be driven.

6. An apparatus according to claim 1, wherein said light-shielding means is stationary in a direction perpendicular to the optical axis.

7. An apparatus according to claim 3, wherein said light-shielding means moves with movement of said lens unit.

8. An image stabilizing apparatus comprising:
   a plurality of lens units for forming an image;
   driving means for driving at least one lens unit to be decentered from an optical axis in order to stabilize an image; and
   light-shielding means with a fixed aperture diameter, arranged adjacent to said lens unit to be driven, and stationary in a direction perpendicular to the optical axis.

9. An apparatus according to claim 8, wherein said lens unit to be driven and said light-shielding means move along the optical axis in order to perform zooming.

10. An apparatus according to claim 8, wherein said light-shielding means regulates light beams incident on or emerging from said lens unit to be driven.

11. An apparatus according to claim 8, wherein said light-shielding means is stationary in a direction perpendicular to the optical axis.

12. An image stabilizing apparatus comprising:
    a plurality of lens units for forming an image;
    driving means for driving at least one lens unit to be decentered from an optical axis in order to stabilize an image; and
    light-shielding means having a predetermined shaped aperture and stationary in a direction perpendicular to the optical axis in order to reduce alternation of peripheral light generated by driving said lens unit to be decentered.

13. An image stabilizing apparatus according to claim 12, wherein said lens unit to be driven and said light-shielding means move along the optical axis in order to perform zooming.

14. An image stabilizing apparatus according to claim 12, wherein said light-shielding means regulates light beams incident on or emerging from said lens unit to be driven.

15. An image stabilizing apparatus according to claim 12, wherein a size of said light-shielding means is smaller than a size of said lens unit to be decentered.

16. An image stabilizing apparatus comprising:
    a plurality of lens units for forming an image;
    driving means for driving at least one lens unit to be decentered from an optical axis in order to stabilize an image; and
    light-shielding means for shielding light passing through a space formed when said lens unit is driven by said driving means.

17. An image stabilizing apparatus according to claim 16, wherein said lens unit to be driven is moved along the optical axis to perform zooming.

18. An image stabilizing apparatus according to claim 16, wherein said light-shielding means has a predetermined aperture diameter.

19. An image stabilizing apparatus according to claim 16, wherein a size of said light-shielding means regulates light beams incident on or emerging from said lens unit to be driven.

20. An image stabilizing apparatus according to claim 16, wherein said light-shielding means is stationary in a direction perpendicular to the optical axis.

21. An image stabilizing apparatus according to claim 17, wherein said light-shielding means moves with movement of said lens unit.

\* \* \* \* \*